United States Patent
Cantu et al.

(10) Patent No.: US 11,338,944 B2
(45) Date of Patent: May 24, 2022

(54) CONTROL SYSTEM FOR EXECUTING A SAFING MODE SEQUENCE IN A SPACECRAFT

(71) Applicant: The Boeing Company, Chicago, IL (US)

(72) Inventors: Cecilia G. Cantu, Playa Del Rey, CA (US); Gary E. Lemke, Torrance, CA (US); John Preston Charles Mills, Redondo Beach, CA (US); Christopher James Wasson, Torrance, CA (US)

(73) Assignee: GM Global Technology Operations LLC, Detroit, MI (US)

( * ) Notice: Subject to any disclaimer, the term of this patent is extended or adjusted under 35 U.S.C. 154(b) by 351 days.

(21) Appl. No.: 16/425,282

(22) Filed: May 29, 2019

(65) Prior Publication Data
US 2020/0377240 A1    Dec. 3, 2020

(51) Int. Cl.
*B64G 1/52*        (2006.01)
*B64G 1/24*        (2006.01)
(Continued)

(52) U.S. Cl.
CPC .............. *B64G 1/52* (2013.01); *B64G 1/242* (2013.01); *B64G 1/244* (2019.05); *B64G 1/283* (2013.01);
(Continued)

(58) Field of Classification Search
CPC .......... B64G 1/52; B64G 1/244; B64G 1/242; B64G 1/283; B64G 1/443; B64G 1/361;
(Continued)

(56) References Cited

U.S. PATENT DOCUMENTS

| | | | |
|---|---|---|---|
| 5,788,188 A | | 8/1998 | Damilano |
| 6,021,979 A | * | 2/2000 | Bender .................. B64G 1/244 |
| | | | 244/164 |

(Continued)

FOREIGN PATENT DOCUMENTS

| | | |
|---|---|---|
| WO | 2019191294 A1 | 10/2019 |
| WO | 2020188207 A1 | 9/2020 |

OTHER PUBLICATIONS

Nehrenz et. al. "On the Development of Spacecraft Operating Modes for a Deep Space CubeSat" (Year: 2015).*

(Continued)

*Primary Examiner* — Assres H Woldemaryam
(74) *Attorney, Agent, or Firm* — Vivacqua Crane, PLLC

(57) ABSTRACT

A control system configured to execute a safing mode sequence for a spacecraft is disclosed. The control system includes one or more star trackers that each include a field of view to capture light from a plurality of space objects surrounding the celestial body. The control system also includes one or more actuators, one or more processors in electronic communication with the one or more actuators, and a memory coupled to the one or more processors. The memory stores data into a database and program code that, when executed by the one or more processors, causes the control system to determine a current attitude of the spacecraft, and re-orient the spacecraft from a current attitude into a momentum neutral attitude.

20 Claims, 7 Drawing Sheets

(51) Int. Cl.
  *B64G 1/28* (2006.01)
  *B64G 1/44* (2006.01)
  *B64G 1/36* (2006.01)
(52) U.S. Cl.
  CPC ............ *B64G 1/361* (2013.01); *B64G 1/443* (2013.01); *B64G 2001/245* (2013.01)
(58) Field of Classification Search
  CPC .... B64G 2001/245; B64G 1/365; B64G 1/36; B64G 1/422; B64G 1/425; B64G 1/405; B64G 1/26; B64G 1/32; B64G 1/286; B64G 1/50; B64G 1/288; B64G 1/366; B64G 1/363
  See application file for complete search history.

(56) References Cited

U.S. PATENT DOCUMENTS

| | | | |
|---|---|---|---|
| 6,205,378 B1 | 3/2001 | Rodden et al. | |
| 6,318,676 B1 | 11/2001 | Turner et al. | |
| 7,051,981 B2 | 5/2006 | Wehner et al. | |
| 7,823,836 B2 | 11/2010 | Ho et al. | |
| 10,464,694 B1 | 11/2019 | Schwarz et al. | |
| 2003/0149529 A1 | 8/2003 | Heatwole et al. | |
| 2005/0263647 A1 | 12/2005 | Wehner et al. | |
| 2006/0186274 A1* | 8/2006 | Wang ..................... | B64G 1/361 244/158.4 |
| 2008/0128559 A1 | 6/2008 | Ho et al. | |
| 2011/0168848 A1* | 7/2011 | Ih ........................... | B64G 1/283 244/165 |
| 2013/0313369 A1* | 11/2013 | Celerier ................. | B64G 1/242 244/158.6 |
| 2014/0034784 A1* | 2/2014 | Forestier ................ | B64G 1/242 244/158.6 |
| 2014/0209750 A1 | 7/2014 | Guyot | |
| 2016/0116639 A1* | 4/2016 | Engell .................... | G01W 1/10 702/3 |
| 2016/0244189 A1 | 8/2016 | Turner | |
| 2017/0129627 A1 | 5/2017 | Moro et al. | |
| 2018/0339792 A1* | 11/2018 | Cooper ................... | B64G 1/44 |
| 2020/0140122 A1 | 5/2020 | Gunther et al. | |
| 2020/0377235 A1 | 12/2020 | Wasson | |
| 2020/0377236 A1 | 12/2020 | Lemke | |

OTHER PUBLICATIONS

Soat. "Architecture of attitude Determination and Control Subsystem in Consideration of Mode Sequences for Micro Dragon Satellite by Using SysML" (Year: 2016).*
Bigelow "Attitude Determination and Control, on board Computing, & Communication Subsystems Design for CubeSat Mission" (Year: 2011).*
EP, Extended European Search Report, EP Patent Application No. 20175966.9-1010 (dated Oct. 22, 2020).
Response to Non-Final Office Action dated Apr. 8, 2021, U.S. Appl. No. 15/425,926.
United States Patent and Trademark Office. Final Office Action for U.S. Appl. No. 16/425,296, dated Aug. 17, 2021, pp. 1-14.
United States Patent and Trademark Office. Notice of Allowance for U.S. Appl. No. 16/425,303, dated Jul. 22, 2021, pp. 1-22.

* cited by examiner

CONTROL SYSTEM FOR EXECUTING A SAFING MODE SEQUENCE IN A SPACECRAFT

INTRODUCTION

The present disclosure relates to a control system and method for a spacecraft. More particularly, the disclosure relates to a control system for executing a safing mode sequence when a current attitude and ephemeris of the spacecraft are unknown.

BACKGROUND

When a spacecraft enters safing mode all non-essential systems are shut down. However, essential functions such as thermal management and attitude control are still active. It is to be appreciated that when a spacecraft is oriented in a momentum neutral attitude, the least possible amount of momentum accumulation due to external forces is experienced by the spacecraft. Accordingly, the spacecraft's flight computers need to have some knowledge of the spacecraft's orbit in order to compute the momentum neutral attitude. The momentum neutral attitude is dependent upon the spacecraft's orbit. However, in many instances the spacecraft's flight computers do not know the spacecraft's orbit. In such instances, the spacecraft is not able to determine the momentum neutral attitude when entering the safing mode.

Typically, if a spacecraft's orbit is unknown, the spacecraft is oriented into an attitude that provides satisfactory thermal characteristics and solar power. Specifically, the spacecraft is re-oriented into an attitude that is determined based on radiant energy directed towards the spacecraft's solar wings. That is, the safing mode sequence includes locating the sun and then re-orienting the spacecraft to ensure there is sufficient radiant energy directed towards the solar wings. This approach does not require attitude knowledge with respect to any particular reference frame (e.g., distant stars or Earth), however, the approach does require the ability to rotate the spacecraft and sense solar energy levels in the solar arrays. This type of safing mode sequence tends to be time consuming. Furthermore, the spacecraft may experience a high amount of momentum created by external forces such as aerodynamic drag and the gravity gradient, especially when the spacecraft is in a low-earth orbit due to the absence of attitude control. This is because the final orientation of the spacecraft, which is oriented so as to provide sufficient solar power, does not account for external forces and torques that may cause the spacecraft momentum to grow.

SUMMARY

According to several aspects, a control system configured to execute a safing mode sequence for a spacecraft is disclosed. The control system includes one or more star trackers that each include a field of view to capture light from a plurality of space objects surrounding the celestial body and a star tracker processor to determine a current attitude of the spacecraft, one or more actuators, one or more processors in electronic communication with the one or more actuators and the star tracker processor, and a memory coupled to the one or more processors. The memory stores data into a database and program code that, when executed by the one or more processors, causes the control system to determine a current attitude of the spacecraft is unknown, where the spacecraft revolves in an orbit around a celestial body. In response to determining the current attitude of the spacecraft is unknown, the control system instructs the one or more actuators to rotate the spacecraft about a rotational axis, where the one or more star trackers capture the light from the plurality of space objects surrounding the celestial body as the spacecraft rotates about the rotational axis. The control system is also caused to receive the current attitude from the star tracker processor. In response to receiving the current attitude, the control system instructs the one or more actuators to cease rotating the spacecraft about the rotational axis and re-orient the spacecraft from the current attitude into a momentum neutral attitude.

In another aspect, a spacecraft configured to orbit a celestial body is disclosed. The spacecraft includes a main body defining a rotational axis and one or more star trackers that each include a field of view to capture light from a plurality of space objects surrounding the celestial body and a star tracker processor to determine a current attitude of the spacecraft. The spacecraft also includes one or more actuators, one or more processors in electronic communication with the one or more actuators and the star tracker processor, and a memory coupled to the one or more processors. The memory stores data into a database and program code that, when executed by the one or more processors, causes the spacecraft to determine a current attitude of the spacecraft is unknown, where the spacecraft revolves in an orbit around a celestial body. In response to determining the current attitude of the spacecraft is unknown, the spacecraft instructs the one or more actuators to rotate the spacecraft about the rotational axis of the main body, where the one or more star trackers capture the light from the plurality of space objects surrounding the celestial body as the spacecraft rotates about the rotational axis. The spacecraft receives the current attitude from the star tracker processor. In response to receiving the current attitude, the spacecraft instructs the one or more actuators to cease rotating the spacecraft about the rotational axis and re-orient the spacecraft from the current attitude into a momentum neutral attitude.

In still another aspect, a method for executing a safing mode sequence for a spacecraft is disclosed. The method includes determining, by a computer, a current attitude of the spacecraft is unknown, where the spacecraft revolves in an orbit around a celestial body. In response to determining the current attitude of the spacecraft is unknown, the method includes instructing one or more actuators to rotate the spacecraft about a rotational axis, where one or more star trackers of the spacecraft capture light from a plurality of space objects surrounding the celestial body as the spacecraft rotates about the rotational axis. The method also includes receiving, by the computer, the current attitude from the star tracker processor. In response to receiving the current attitude, the method includes instructing, by the computer, the one or more actuators to cease rotating the spacecraft about the rotational axis. Finally, the method includes re-orienting the spacecraft from the current attitude into a momentum neutral attitude by the one or more actuators.

The features, functions, and advantages that have been discussed may be achieved independently in various embodiments or may be combined in other embodiments further details of which can be seen with reference to the following description and drawings.

BRIEF DESCRIPTION OF THE DRAWINGS

The drawings described herein are for illustration purposes only and are not intended to limit the scope of the present disclosure in any way.

DETAILED DESCRIPTION

The present disclosure is directed towards a control system for a spacecraft. The control system executes a safing mode sequence that re-orients the spacecraft from a current attitude into a momentum neutral attitude. When the spacecraft enters the safing mode, sometimes the current attitude of the spacecraft is unknown by the spacecraft's flight computers. The spacecraft is rotated about a rotational axis while one or more star trackers capture light from a plurality of space objects that surround the celestial body to create measurements representing the current attitude of the spacecraft. Once the flight computers determine the current attitude of the spacecraft using the measurements from the star trackers, the flight computers instruct the actuators to re-orient the spacecraft from the current attitude into a momentum neutral attitude.

In addition to re-orienting the spacecraft into the momentum neutral attitude, the disclosure also determines a position of the spacecraft's solar wings that result in a maximum local value of electrical current. The electrical current is generated by a plurality of photovoltaic cells that are disposed along the solar wings of the spacecraft.

The following description is merely exemplary in nature and is not intended to limit the present disclosure, application, or uses.

Figure 1:
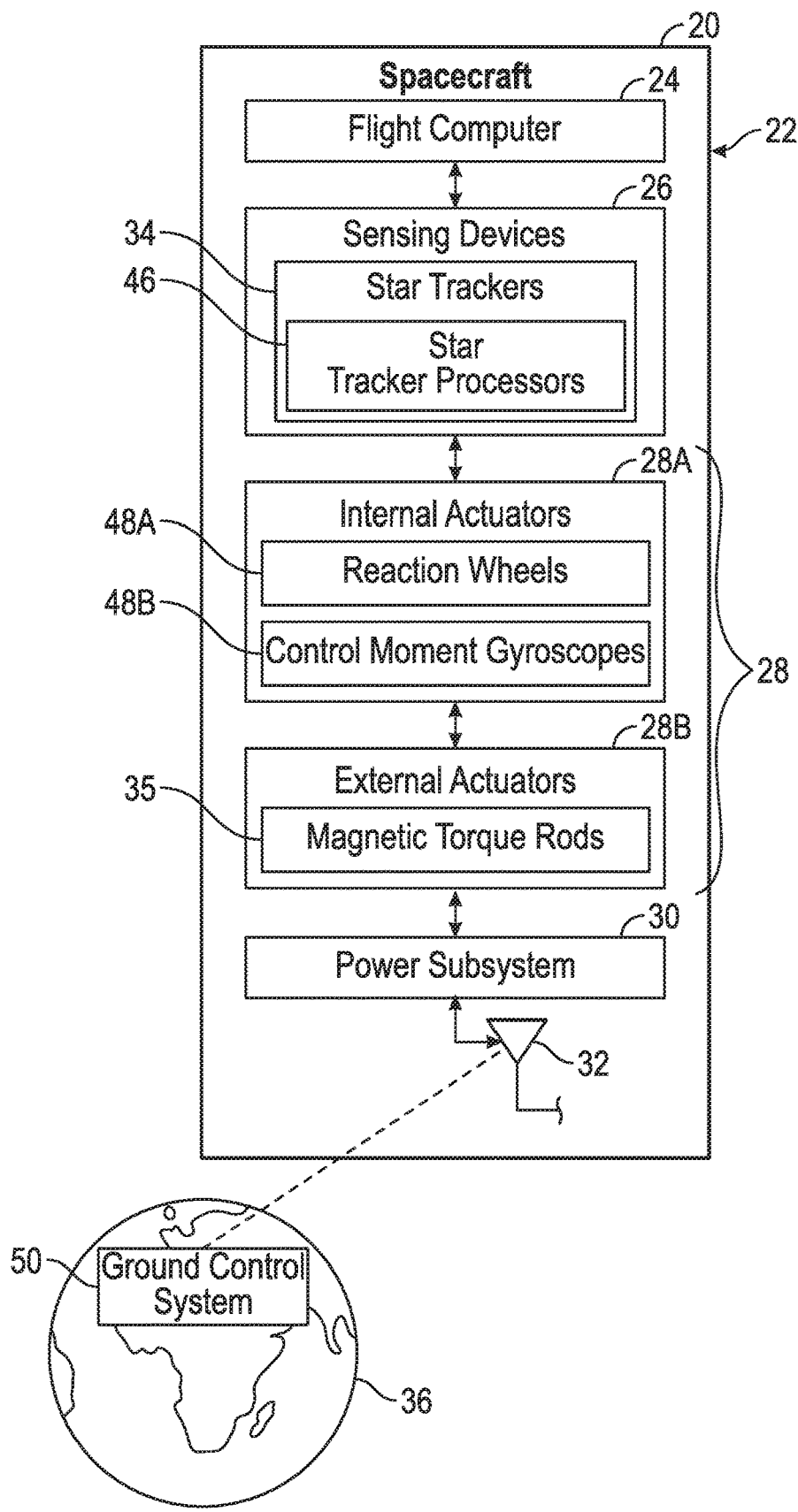
FIG. 1 is a schematic diagram of a spacecraft having a control system configured to execute a safing mode sequence, according to an exemplary embodiment.
Figure 8:
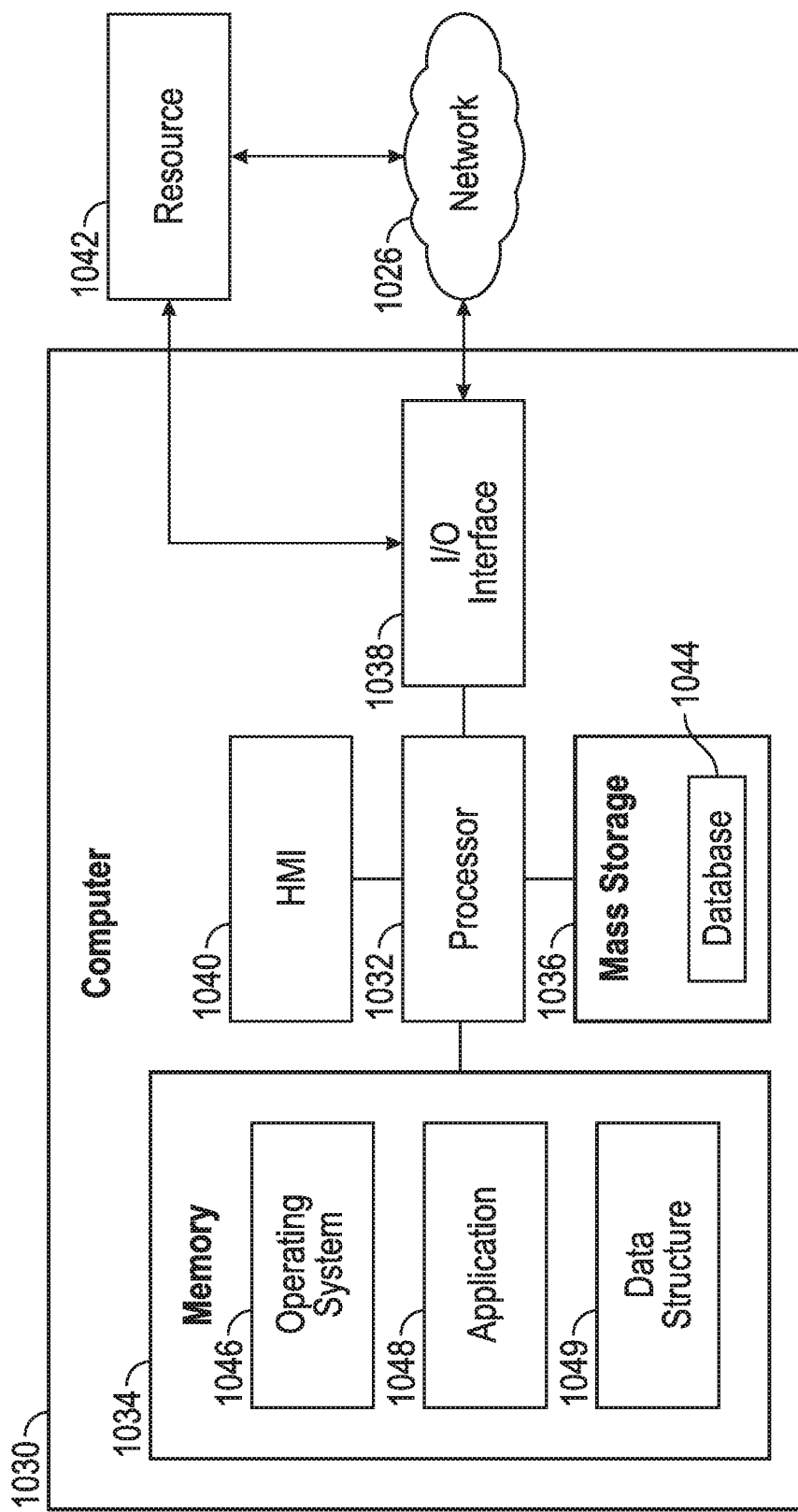
FIG. 8 is an illustration of a computer system, according to an exemplary embodiment.

Referring to FIG. 1, a schematic diagram of an exemplary spacecraft 20 is illustrated. The spacecraft 20 includes a control system 22 including one or more flight computers 24 that are in electronic communication with a plurality of sensing devices 26, one or more actuators 28, one or more power subsystems 30, and one or more antennas 32. A detailed diagram of an exemplary flight computer 24 is shown in FIG. 8 and is described below. The one or more actuators 28 include a plurality of internal actuators 28A and a plurality of external actuators 28B. As explained below, the control system 22 executes a safing mode sequence that determines the spacecraft's current attitude and then re-orients the spacecraft from the current attitude into a momentum neutral attitude. It is to be appreciated that the momentum neutral attitude represents an attitude that reduces the effects of external forces and torques on the spacecraft's momentum over time, however, these effects may not be completely eliminated. Thus, the spacecraft 20 may still experience some momentum growth over time, but the momentum growth is relatively less when compared to other attitudes.

Figure 2A:
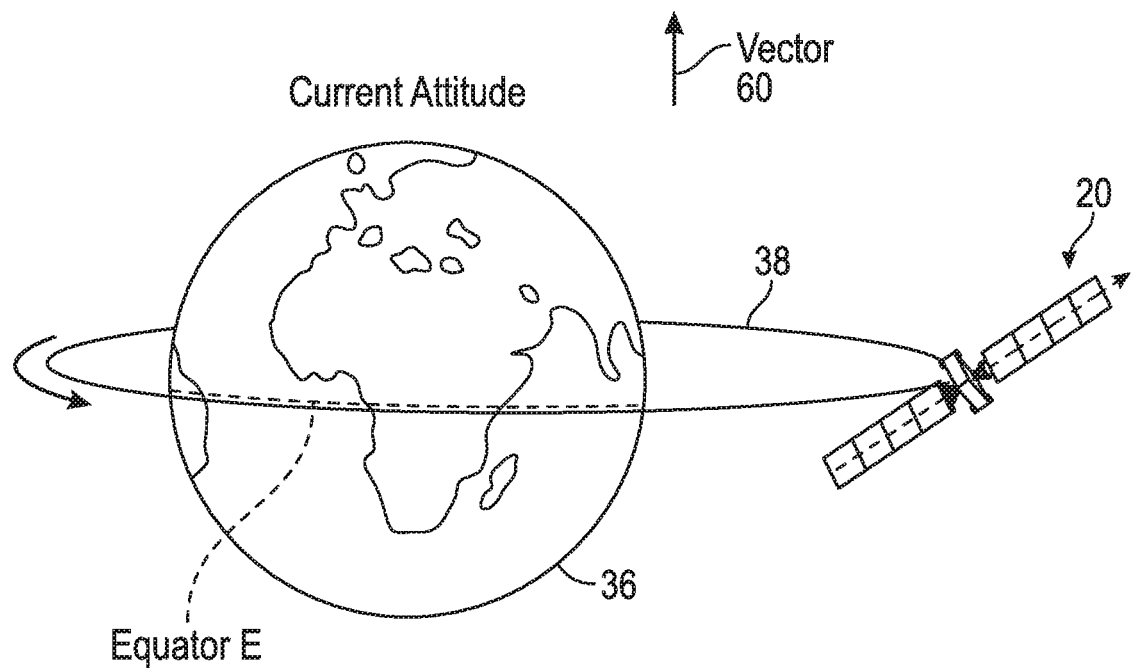
FIG. 2A is an illustration of the spacecraft oriented in a current attitude before the safing mode sequence is executed, according to an exemplary embodiment.
Figure 2B:
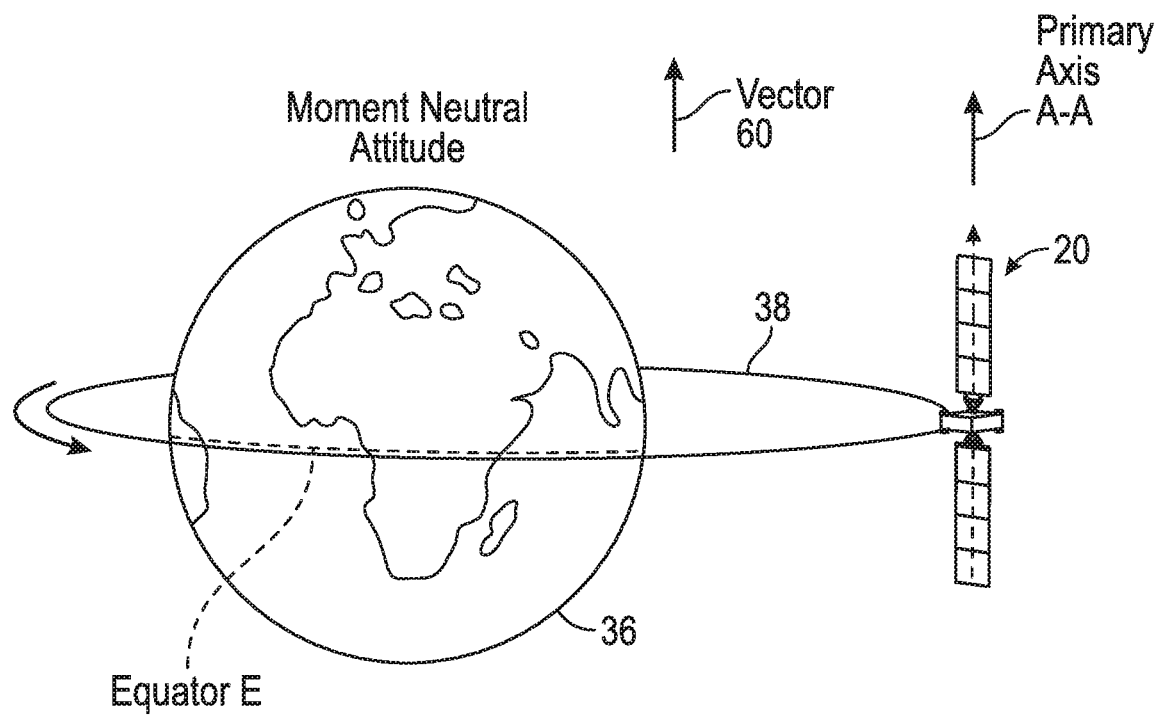
FIG. 2B is an illustration of the spacecraft oriented in a momentum neutral attitude after the safing mode sequence is executed, according to an exemplary embodiment.

Referring to FIGS. 2A and 2B, the spacecraft 20 revolves in an orbit 38 around a celestial body 36. For example, in the embodiment as shown, the celestial body 36 is the Earth. However, it is to be appreciated that the spacecraft 20 may orbit around any other celestial body 36 as well. In the embodiment as shown in FIG. 2A, the spacecraft 20 revolves around the celestial body 36 at the current attitude. It is to be appreciated that in some embodiments, the current attitude of the spacecraft 20 is unknown by the flight computers 24 (FIG. 1) as the spacecraft 20 enters the safing mode. As explained below, once the current attitude is determined, the spacecraft 20 is re-oriented into the momentum neutral attitude shown in FIG. 2B.

Figure 3:
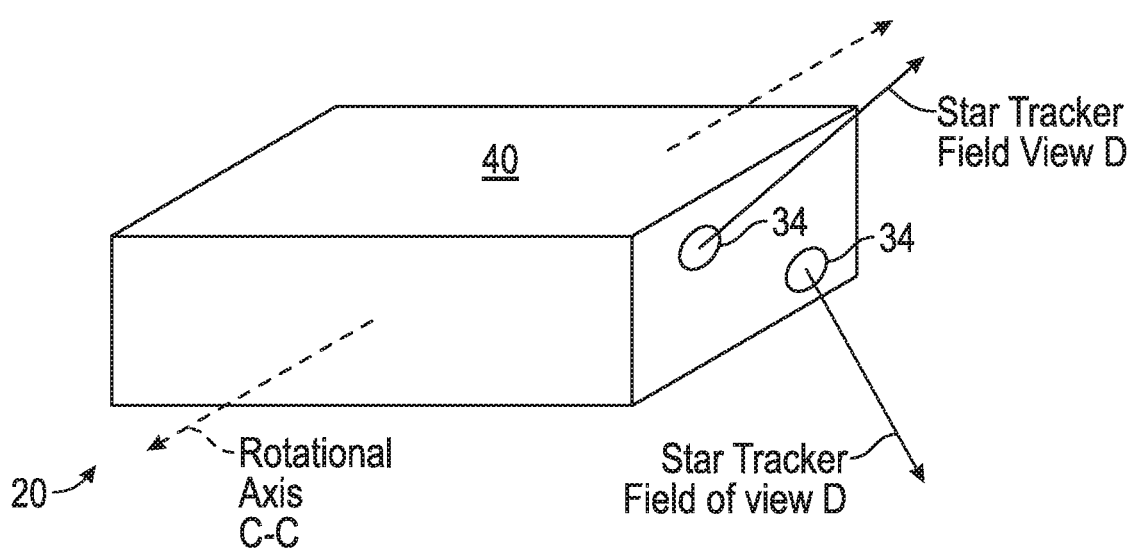
FIG. 3 is an illustration of the spacecraft main body, according to an exemplary embodiment.

Referring to FIG. 1, the sensing devices 26 measure the attitude of the spacecraft 20. The sensing devices 26 include, but are not limited to, a gyroscope, a magnetometer, a sun sensor, an earth sensor, an accelerometer, a global positioning system (GPS), and one or more star trackers 34. FIG. 3 is a perspective view of the spacecraft 20. The spacecraft 20 includes a main body 40, where the star trackers 34 are mounted to the main body 40 of the spacecraft 20. In the exemplary embodiment as shown, two star trackers 34 are positioned on the main body 40 of the spacecraft 20. While the spacecraft 20 may include more than two star trackers 34, it is to be appreciated that using two star trackers 34 allows more flexibility in where each star tracker 34 is mounted and aligned upon the spacecraft 20. Furthermore, it is also to be appreciated that fewer components (such as the star trackers 34) also result in reduced mass and associated cost.

The star trackers 34 each include a field of view configured to capture light generated or reflected from one or more heavenly bodies that surround the spacecraft 20. Each star tracker 34 is pointed to orient the respective field of view field in a unique direction, where the unique direction for each star tracker 34 is indicated by a star tracker field of view D. The heavenly bodies include, for example, stars, the Sun, planets, satellites, the Moon (i.e., the body orbiting the Earth), and moons that orbit around a planet other than Earth. The heavenly bodies each include a known position in space. The known position of each of the heavenly bodies are used as references to determine a current attitude of the spacecraft 20. Specifically, the star trackers 34 include one or more star tracker processors 46 (FIG. 1) that measure an apparent position of the heavenly bodies in a reference frame of the spacecraft 20, determine an identity of each of the heavenly bodies (e.g., as the Sun, Moon, stars, etc.), and compare the apparent position of the heavenly bodies with a known absolute position from a reference catalog to create measurements that represent the current attitude of the spacecraft 20. The measurements representing the current attitude of the spacecraft 20 are then communicated to the flight computers 24 (FIG. 1), and the flight computers 24 determine the current attitude based on the measurements.

Continuing to refer to FIG. 3, a rotational axis C-C of the main body 40 of the spacecraft 20 is illustrated. The rotational axis C-C of the spacecraft 20 is positioned substantially perpendicular to each star tracker field of view D. Accordingly, when the spacecraft 20 is rotated about the rotational axis C-C by an entire revolution (i.e., by 360°), the field of view for each star tracker 34 sweeps or captures the maximum possible amount of space based on the current attitude of the spacecraft 20. As explained below, the safing mode sequence includes rotating the spacecraft 20 about the rotational axis C-C to determine the current attitude. The spacecraft 20 may be rotated about the rotational axis C-C for a full revolution, for a partial revolution (i.e., less than 360°), or for more than one full revolution based on when the flight computers 24 determine the current attitude of the spacecraft 20 based on the measurements representing the current attitude of the spacecraft 20. That is, in some embodiments, once the current attitude is known, the spacecraft 20 ceases to rotate about the rotational axis C-C.

Referring to FIG. 1, the internal actuators 28A are momentum storage devices such as, but not limited to, reaction wheels 48A and control moment gyroscopes 48B. The external actuators 28B may also be referred to as momentum control actuators. The external actuators 28B exert a force upon the spacecraft 20 and include actuators such as, but not limited to, thrusters and one or more magnetic torque rods 35. The thrusters include any type of thruster such as, but not limited to, chemical thrusters, ion thrusters and Hall thrusters. A chemical thruster generates thrust based on a chemical reaction such as, for example, oxidizing a fuel. The power subsystems 30 store and provide electrical power to the various components of the spacecraft 20 and include devices such as, but not limited to, solar panels, radioisotope thermoelectric generators, batteries, capacitor banks, and heat engines.

Figure 4:
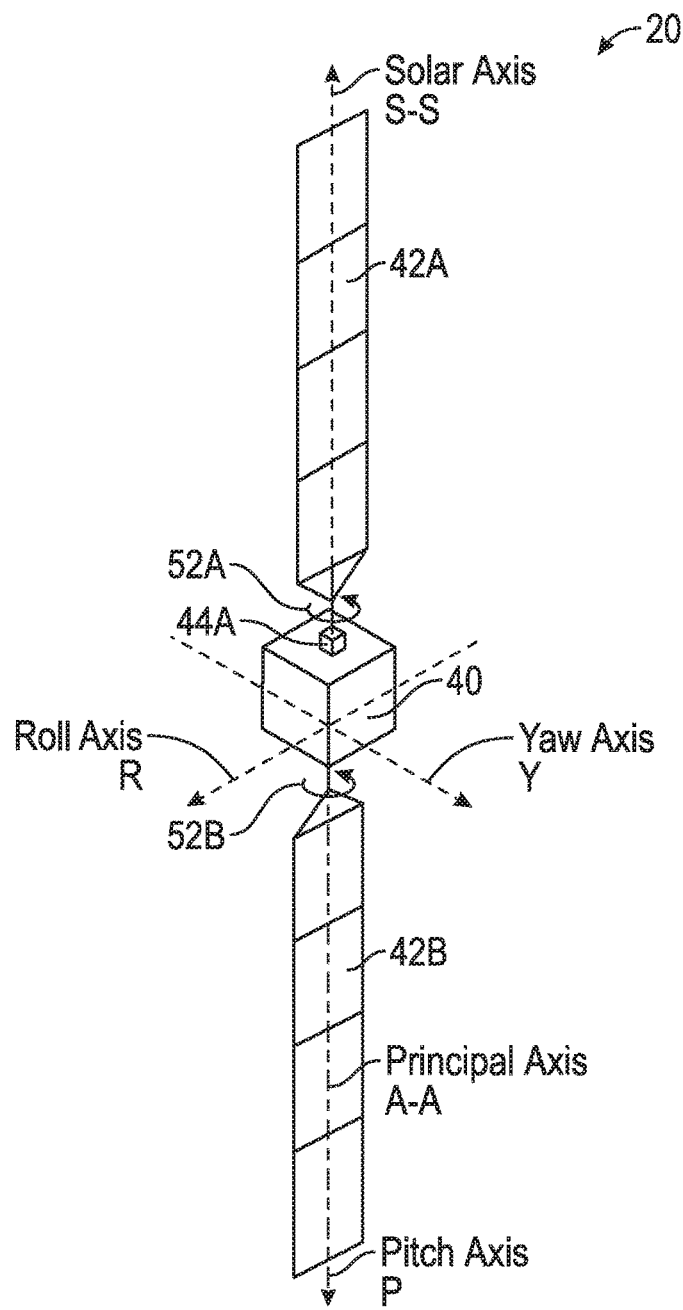
FIG. 4 is a perspective view of the spacecraft and two solar wings, according to an exemplary embodiment.

FIG. 4 is an enlarged view of the spacecraft 20, where the main body 40 defines an axis that is aligned with a minor principal moment of inertia, which is referred to as a principal axis A-A. The principal axis A-A is positioned substantially perpendicular with respect to a roll axis R and a yaw axis Y of the main body 40 of the spacecraft 20. The principal axis A-A is also substantially aligned with a pitch axis P of the main body 40 of the spacecraft 20.

The spacecraft 20 includes two or more solar wings 42A, 42B that project outward from the main body 40 of the spacecraft 20 that are rotatably coupled to the main body 40 of the spacecraft 20. The solar wings 42A and 42B are substantially aligned with the principal axis A-A of the spacecraft 20, where the upper or north solar wing is designated as solar wing 42A and a lower or south solar wing is designated as solar wing 42B. In the embodiment as shown, a solar axis S-S of the spacecraft 20 is substantially aligned with the principal axis A-A. Although FIG. 4 illustrates solar wings 42A, 42B that derive electrical power from sunlight, it is to be appreciated that other electrical devices for generating power may be used as well.

Each solar wing 42A, 42B is connected to a corresponding actuator 44A, 44B (it is to be appreciated that actuator 44B is not visible in the figures). Specifically, a respective yoke 52A, 52B connects one of the solar wings 42A, 42B to the corresponding actuator 44A, 44B. The actuators 44A, 44B provide rotational motion about the solar axis S-S of the spacecraft 20. Referring to both FIGS. 1 and 4, in an embodiment the flight computers 24 instruct the actuators 44A, 44B to rotate the solar wings 42A, 42B about the solar axis S-S.

Figure 5:
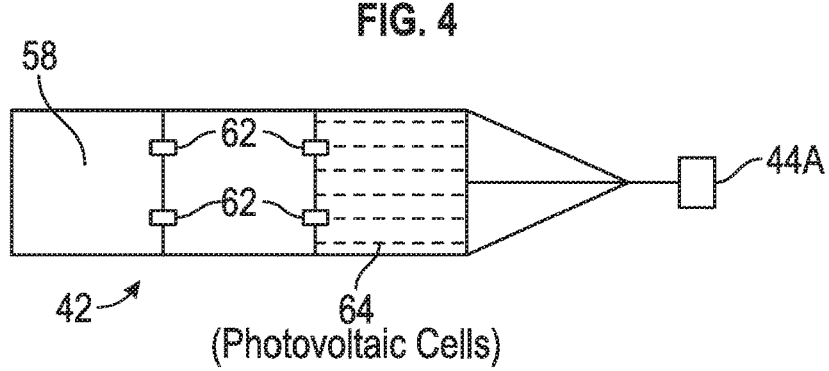
FIG. 5 is an enlarged, detailed view of one of the solar wings shown in FIG. 4, according to an exemplary embodiment.

FIG. 5 is an enlarged view of one of the two solar wings 42A, 42B. The solar wing 42 shown in FIG. 5 includes a plurality of solar panels 58 that may be connected to one another by hinges 62. Each solar panel 58 includes a plurality of photovoltaic cells 64 that generate electrical current from light. Referring to FIGS. 1 and 4, the flight computers 24 instruct the actuators 44A, 44B to rotate the solar wings 42A, 42B about the solar axis S-S while monitoring an electrical current generated by the photovoltaic cells 64. The flight computers 24 continue to instruct the solar wings 42A, 42B to rotate about the solar axis S-S until a maximum local value of the electrical current is determined. The flight computers 24 then determine an angular position of each solar wing 42A, 42B relative to the solar axis S-S when the electrical current produced by the photovoltaic cells 64 is at the maximum local value.

Referring to both FIGS. 1 and 2, the flight computers 24 of the spacecraft 20 are in wireless communication with a ground control system 50 by the antennas 32. In an embodiment, the ground control system 50 is located upon the celestial body 36 that the spacecraft 20 orbits around. For example, the ground control system 50 may be located upon the Earth. Alternatively, the ground control system 50 may be located on Earth, but the spacecraft 20 may be orbiting another celestial body 36 that has an atmosphere. The ground control system 50 includes one or more computers that send and receive data from the flight computers 24 of the spacecraft 20. In an embodiment, the ground control system 50 sends instructions to the flight computer 24.

In an embodiment, the spacecraft 20 enters the safing mode in response to the flight computers 24 determining one or more pre-defined spacecraft safing criteria are met. The pre-defined spacecraft safing criteria includes data collected by the sensing devices 26 and other on-board data such as, but not limited to, solar wing current, temperature readings of the various components of the spacecraft 20, and stored momentum in a momentum storage device. In an embodiment, the spacecraft 20 enters the safing mode when the solar wing current is below a pre-defined current limit and the current conditions indicate the solar wings 42A, 42B should be generating a substantially amount of current. Additionally, some other examples of when the spacecraft 20 enters the safing mode include when the temperature of a specific component (or multiple components) of the spacecraft 20 (e.g., a payload module) exceeds a pre-defined temperature limit, or when the stored momentum of one or more the momentum storage devices exceed a pre-defined momentum limit. Alternatively, in another embodiment, the ground control system 50 transmits a signal to the spacecraft 20 indicating the spacecraft 20 is to enter the safing mode.

The safing mode sequence is executed by the control system 22 in response to the flight computers 24 instructing the spacecraft 20 to enter the safing mode. Thus, the safing mode sequence is now described. Referring to FIGS. 1 and 2A, in response to the spacecraft 20 entering the safing mode, the flight computers 24 determine the current attitude of the spacecraft 20 is unknown. Accordingly, before the spacecraft 20 may be re-oriented into the momentum neutral attitude (seen in FIG. 2B), first the current attitude needs to be determined by the flight computers 24. However, it is to be appreciated that the current attitude of the spacecraft 20 may still be determined even if the current attitude is known.

Referring to FIGS. 1, 2A, and 3, in response to determining the current attitude of the spacecraft 20 is unknown, the flight computers 24 instruct the one or more actuators 28 to rotate the spacecraft 20 about the rotational axis C-C. As seen in FIG. 3, the rotational axis C-C is substantially perpendicular to the field of view of the one or more star trackers 34. Continuing to refer to FIGS. 1, 2A, and 3, in an embodiment the one or more actuators 28 that rotate the spacecraft 20 about the rotational axis C-C include the one or more reaction wheels 48A.

As mentioned above, the one or more star trackers 34 capture the light from the plurality of space objects surrounding the celestial body 36 as the spacecraft 20 rotates about the rotational axis C-C. The star tracker processors 46 measure the apparent position of the heavenly bodies in the reference frame of the spacecraft 20. The measurements representing the current attitude of the spacecraft 20 are then communicated to the flight computers 24. The flight computers 24 determine the current attitude of the spacecraft 20 based on the measurements from the star trackers 34.

Referring to both FIGS. 2A and 2B, the orbit 38 around the celestial body 36 is shown as an elliptical orbit having a relatively high eccentricity (e.g., where the eccentricity e is about 0.8). However, it is to be appreciated that this illustration is merely exemplary in nature and other eccentricities may be used as well. It is to be appreciated that the flight computers 24 (FIG. 1) of the spacecraft 20 may or may not have knowledge of the orbit 38. In some embodiments, even if the orbit 38 is known, the flight computers 24 still do not have knowledge of the current attitude.

As seen in both FIGS. 2A and 2B, a vector 60 is defined. The vector 60 is substantially normal with respect to the orbit 38 that the spacecraft 20 follows around the celestial body 36. In the exemplary embodiment as shown in FIG. 2, the orbit 38 around the celestial body 36 is an equatorial orbit. That is, the orbit 38 is substantially aligned with an equator E of the celestial body 36. However, it is to be appreciated that the orbit 38 and the vector 60 may be positioned into orientations other than the illustration shown in FIGS. 2A and 2B. For example, in another embodiment, the celestial body 36 may include an inclined orbit instead.

Referring to FIGS. 1 and 3, the flight computers 24 determine the current attitude based on the measurements representing the current attitude from the star trackers 34. In response to determining the current attitude, the one or more actuators 28 are instructed to re-orient the spacecraft 20 from the current attitude (FIG. 2A) into the momentum neutral attitude (FIG. 2B). In some embodiments, the flight computers 24 instruct the one or more actuators 28 to cease rotating the spacecraft 20 about the rotational axis C-C. However, it is to be appreciated that in an alternative approach the spacecraft 20 continues to rotate about the rotational axis C-C.

Referring now to FIGS. 1, 2A, 2B, and 4, as the spacecraft 20 is re-oriented into the momentum neutral attitude, the flight computers 24 instruct the one or more actuators 28 to substantially align the principal axis A-A of the spacecraft 20 with the vector 60 normal to the orbit 38 around the celestial body 36. The one or more actuators 28 that align the principal axis A-A of the spacecraft 20 with the vector 60 may be selected from any of the internal actuators 28A and the external actuators 28B. As seen in FIG. 2B, when the spacecraft 20 in oriented in the momentum neutral attitude, the principal axis A-A of the spacecraft 20 is substantially aligned with the vector 60. It is to be appreciated that aligning the principal axis A-A of the spacecraft 20 reduces or substantially eliminates gravity gradient torque.

In an embodiment, the ground control system 50 (FIG. 1) has knowledge of the space's orbit 38. The ground control system 50 also has access to the spacecraft's predicted trajectory as the spacecraft 20 travels through different orbits. Accordingly, in an embodiment, the ground control system 50 determines the momentum neutral attitude for the different orbits and uploads the values of the momentum neutral attitudes to the memory 1034 (FIG. 8) of the flight computers 24. It is to be appreciated that the same momentum neutral attitude exists for different orbits as long as their inertial plane remains the same. For example, in the embodiment as shown in FIGS. 2A and 2B, the orbit 38 is eccentric and is substantially aligned with the equator E of the celestial body 36. Thus, the momentum neutral attitude remains the same even if the eccentricity e of the orbit 38 changes.

Once the spacecraft 20 is in the momentum neutral attitude, then the one or more magnetic torque rods 35 (FIG. 1) perform momentum management of the spacecraft 20 based on momentum dumping. The magnetic torque rods 35 may be used to continuously reduce the momentum of the spacecraft 20 when in a steady-state safing mode. Furthermore, it is also to be appreciated that the magnetic torque rods 35 utilize the electrical power created by the photovoltaic cells 64 (FIG. 5). In contrast, thrusters require fuel to operate. Fuel is a limited resource upon any spacecraft.

Referring generally to FIGS. 1, 3, 4, and 5, as the spacecraft 20 rotates about the rotational axis C-C seen in FIG. 3, the flight computers 24 also determine the angular position of each solar wing 42A, 42B (FIG. 4) relative to the solar axis S-S when the electrical current produced by the photovoltaic cells 64 (FIG. 5) is at the maximum local value. When the solar wings 42A, 42B are in the angular position, the electric current generated by the photovoltaic cells 64 is at the maximum local value.

In an embodiment, the flight computers 24 first instruct the one or more solar wings 42, 42B to rotate about the solar axis S-S, where the spacecraft 20 simultaneously rotates about the rotational axis C-C (seen in FIG. 3). The flight computers 24 monitor the electrical current generated by the plurality of photovoltaic cells 64 as the one or more solar wings 42A, 42B rotate about the solar axis. The flight computers 24 determine the maximum local value of the electrical current as the one or more solar wings 42A, 42B rotate about the solar axis S-S. The flight computers 24 also determine the angular position of the one or more solar wings 42A, 42B relative to the solar axis S-S when the electrical current is at the maximum local value.

Figure 6:
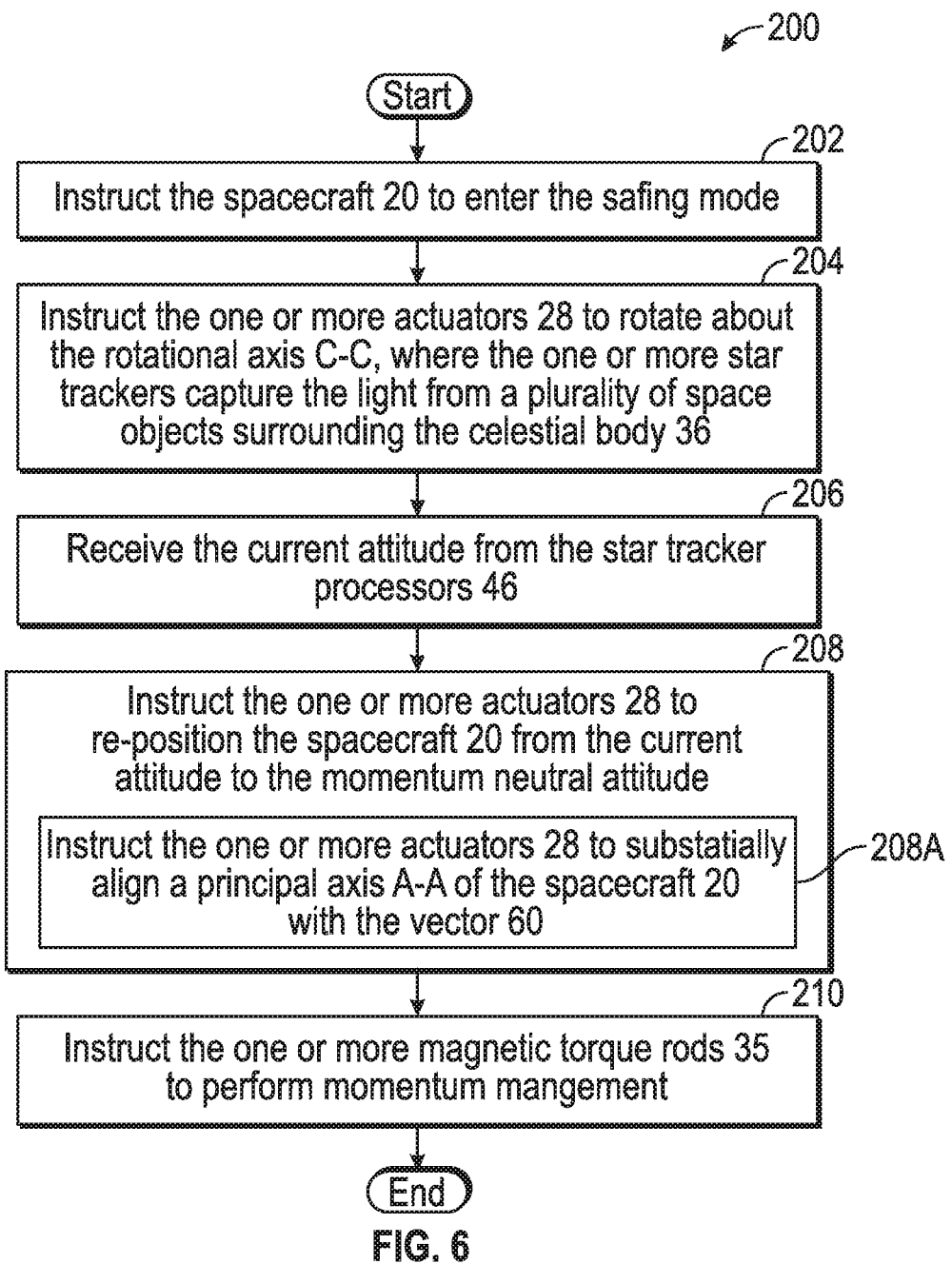
FIG. 6 is a process flow diagram illustrating an exemplary method for re-positioning the spacecraft into the momentum neutral attitude shown in FIG. 2B, according to an exemplary embodiment.
Figure 7:
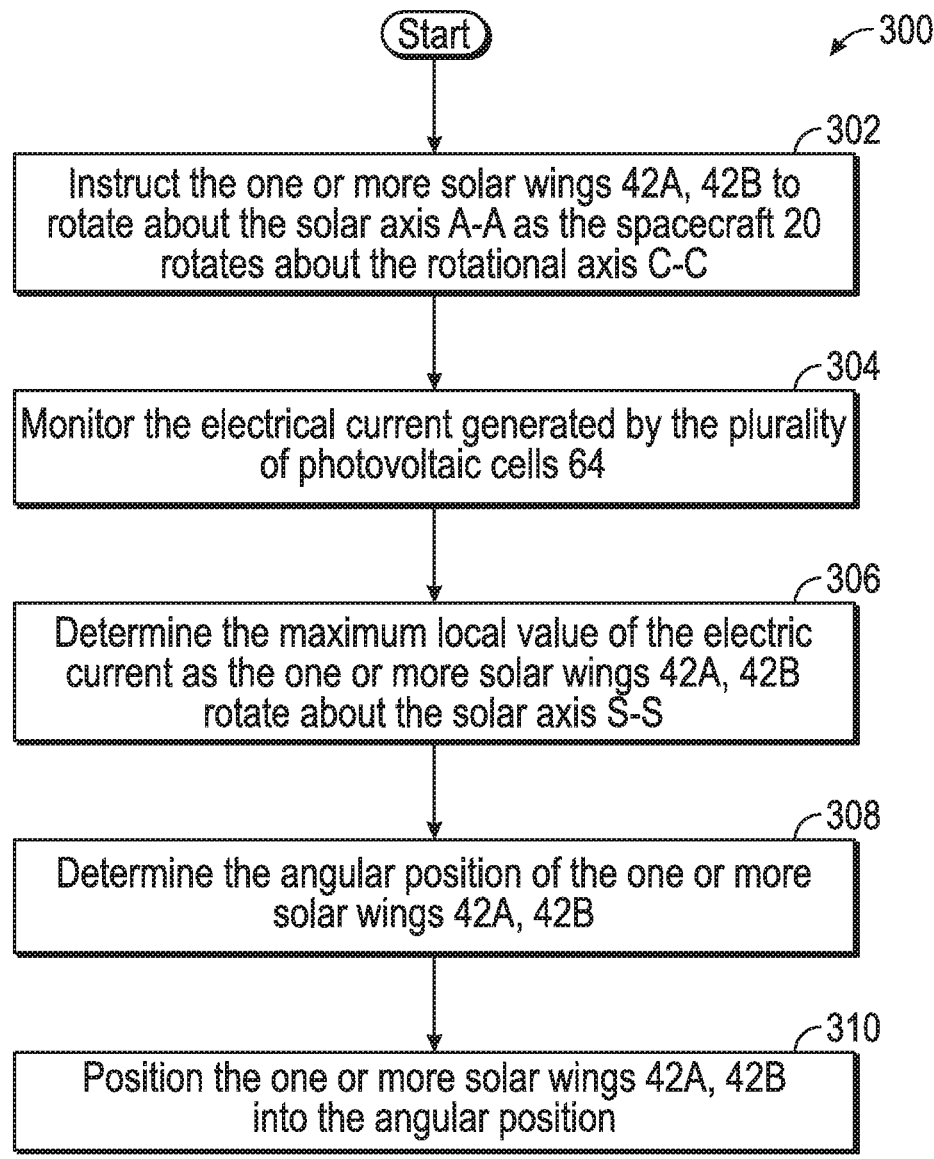
FIG. 7 is a process flow diagram illustrating a method for re-orienting the solar wings shown in FIG. 4 while the spacecraft determines the current attitude, according to an exemplary embodiment.

FIG. 6 is a process flow diagram illustrating an exemplary method 200 for executing the disclosed safing mode sequence. Specifically, FIG. 6 illustrates the method 200 for re-orienting the spacecraft 20 into the momentum neutral attitude shown in FIG. 2B. FIG. 7 illustrates another process flow diagram illustrating a method 300 that is executed simultaneously with the method 200 shown in FIG. 6. The method 300 positions the solar wings 42A, 42B shown in FIG. 4 into the angular position.

Referring generally to FIGS. 1 and 3, the method begins at block 202. In block 202, the flight computers 24 instruct the spacecraft 20 enter the safing mode. As mentioned above, the spacecraft 20 enters the safing mode in response to the flight computers 24 determining one or more predefined spacecraft safing criteria are met. The method 200 may then proceed to block 204.

In block 204, in response to entering the safing mode, the flight computers 24 instruct the one or more actuators 28 to rotate the spacecraft about the rotational axis C-C seen in FIG. 3, where the one or more star trackers 34 capture the light from the plurality of space objects surrounding the celestial body 36 as the spacecraft 20 rotates about the rotational axis C-C to create measurements that represent the current attitude of the spacecraft 20.

As mentioned above, the spacecraft 20 also rotates the solar wings 42A, 42B shown in FIG. 4 at the same time. That is, as block 206 is performed, the method 300 is also executed. Referring now to FIGS. 1, 4, and 7, the method 300 begins at block 302. In block 302, the flight computers 24 instruct the one or more solar wings 42A, 42B to rotate about the solar axis S-S as the spacecraft 20 rotates about the rotational axis C-C. In block 304, the flight computers 24 also monitor the electrical current generated by the plurality of photovoltaic cells 64 (FIG. 5) as the one or more solar wings 42A, 42B rotate about the solar axis S-S. In block 306, the flight computers determine the maximum local value of the electrical current as the one or more solar wings 42A, 42B rotate about the solar axis S-S. In block 308, the flight computers 24 determine the angular position of the one or more solar wings 42A, 42B relative to the solar axis S-S when the electrical current is at the maximum local value. In block 310, once the angular position is known, the flight computers 24 instruct the actuators 44A, 44B to position the one or more solar wings 42A, 42B into the angular positions determined in block 308.

Referring back to FIGS. 1 and 6, in block 206, the flight computers 24 determine the current attitude based on the measurements representing the current attitude of the spacecraft 20. The method 200 may then proceed to block 208.

In block 208, in response to determining the current attitude, the flight computers 24 instruct the one or more actuators 28 to re-orient the spacecraft 20 from the current attitude (FIG. 2A) and into a momentum neutral attitude (FIG. 2B). As mentioned above, in block 208A, the flight computers 24 also instruct the one or more actuators 28 to substantially align the principal axis A-A of the spacecraft 20 (seen in FIG. 4) with the vector 60 (FIGS. 2A and 2B) that is normal to the orbit 38 around the celestial body 36. The method 200 may then proceed to block 210.

In block 210, the flight computers 24 instruct the one or more magnetic torque rods 35 (FIG. 1) to perform momentum management of the spacecraft 20 based on momentum dumping. The method 200 may then terminate.

Referring generally to the figures, the present disclosure provides an approach for positioning the spacecraft into a momentum neutral attitude, even when there is no knowledge of the spacecraft's current attitude. Accordingly, even in low-earth and mid-earth orbits, the spacecraft experiences reduced momentum accumulation when compared to conventional strategies that only account for the spacecraft's rate and not attitude. Furthermore, it is also to be appreciated that the disclosed approach does not require sun sensors, and instead employs star trackers. Star trackers are attitude sensors that are already present in the spacecraft. Thus, there is no additional hardware cost associated with the disclosed safing mode sequence. Once the spacecraft is in the momentum neutral attitude, magnetic torque rods are utilized for momentum management of the spacecraft. Magnetic torque rods do not require an initial configuration and set-up for operation, unlike thrusters. Therefore, unlike some conventional sequencing approaches that use thrusters, the magnetic thrusters may be used from the beginning of a mission.

Referring now to FIG. 8, the flight computer 24, the star tracker processor 46, and the ground control system 50 are implemented on one or more computer devices or systems, such as exemplary computer system 1030. The computer system 1030 includes a processor 1032, a memory 1034, a mass storage memory device 1036, an input/output (I/O) interface 1038, and a Human Machine Interface (HMI) 1040. The computer system 1030 is operatively coupled to one or more external resources 1042 via the network 1026 or I/O interface 1038. External resources may include, but are not limited to, servers, databases, mass storage devices, peripheral devices, cloud-based network services, or any other suitable computer resource that may be used by the computer system 1030.

The processor 1032 includes one or more devices selected from microprocessors, micro-controllers, digital signal processors, microcomputers, central processing units, field programmable gate arrays, programmable logic devices, state machines, logic circuits, analog circuits, digital circuits, or any other devices that manipulate signals (analog or digital) based on operational instructions that are stored in the memory 1034. Memory 1034 includes a single memory device or a plurality of memory devices including, but not limited to, read-only memory (ROM), random access memory (RAM), volatile memory, non-volatile memory, static random-access memory (SRAM), dynamic random-access memory (DRAM), flash memory, cache memory, or any other device capable of storing information. The mass storage memory device 136 includes data storage devices such as a hard drive, optical drive, tape drive, volatile or non-volatile solid-state device, or any other device capable of storing information.

The processor 1032 operates under the control of an operating system 1046 that resides in memory 1034. The operating system 1046 manages computer resources so that computer program code embodied as one or more computer software applications, such as an application 1048 residing in memory 1034, may have instructions executed by the processor 1032. In an alternative embodiment, the processor 1032 may execute the application 1048 directly, in which case the operating system 1046 may be omitted. One or more data structures 1049 also reside in memory 1034, and may be used by the processor 1032, operating system 1046, or application 1048 to store or manipulate data.

The I/O interface 1038 provides a machine interface that operatively couples the processor 1032 to other devices and systems, such as the network 1026 or external resource 1042. The application 1048 thereby works cooperatively with the network 1026 or external resource 1042 by communicating via the I/O interface 1038 to provide the various features, functions, applications, processes, or modules comprising embodiments of the invention. The application 1048 also includes program code that is executed by one or more external resources 1042, or otherwise rely on functions or signals provided by other system or network components external to the computer system 1030. Indeed, given the nearly endless hardware and software configurations possible, persons having ordinary skill in the art will understand that embodiments of the invention may include applications that are located externally to the computer system 1030, distributed among multiple computers or other external resources 1042, or provided by computing resources (hardware and software) that are provided as a service over the network 1026, such as a cloud computing service.

The HMI 1040 is operatively coupled to the processor 1032 of computer system 1030 in a known manner to allow a user to interact directly with the computer system 1030. The HMI 1040 may include video or alphanumeric displays, a touch screen, a speaker, and any other suitable audio and visual indicators capable of providing data to the user. The HMI 1040 also includes input devices and controls such as an alphanumeric keyboard, a pointing device, keypads, pushbuttons, control knobs, microphones, etc., capable of accepting commands or input from the user and transmitting the entered input to the processor 1032.

A database 1044 may reside on the mass storage memory device 1036 and may be used to collect and organize data used by the various systems and modules described herein. The database 1044 may include data and supporting data structures that store and organize the data. In particular, the database 1044 may be arranged with any database organization or structure including, but not limited to, a relational database, a hierarchical database, a network database, or combinations thereof. A database management system in the form of a computer software application executing as instructions on the processor 1032 may be used to access the information or data stored in records of the database 1044 in response to a query, where a query may be dynamically determined and executed by the operating system 1046, other applications 1048, or one or more modules.

The description of the present disclosure is merely exemplary in nature and variations that do not depart from the gist of the present disclosure are intended to be within the scope of the present disclosure. Such variations are not to be regarded as a departure from the spirit and scope of the present disclosure.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A control system configured to execute a safing mode sequence for a spacecraft, the control system comprising:
    one or more star trackers that each include a field of view to capture light from a plurality of space objects surrounding a celestial body;
    one or more actuators;
    one or more processors in electronic communication with the one or more actuators and the one or more star trackers; and
    a memory coupled to the one or more processors, the memory storing data into a database and program code that, when executed by the one or more processors, causes the control system to:
        instruct the spacecraft to enter a safing mode, wherein the spacecraft revolves in an orbit around the celestial body;
        in response to entering the safing mode, determine a current attitude of the spacecraft is unknown and instruct the one or more actuators to rotate the spacecraft about a rotational axis, wherein the one or more star trackers capture the light from the plurality of space objects surrounding the celestial body as the spacecraft rotates about the rotational axis to create measurements that represent a current attitude of the spacecraft;
        determine the current attitude of the spacecraft based on the measurements created by the one or more star trackers; and
        in response to determining the current attitude, instruct the one or more actuators to re-orient the spacecraft from the current attitude into a momentum neutral attitude.

2. The control system of claim 1, wherein the one or more processors execute instructions to:
    instruct the one or more actuators to substantially align a principal axis of the spacecraft with a vector that is normal to the orbit around the celestial body as the spacecraft is re-oriented into the momentum neutral attitude.

3. The control system of claim 1, wherein the one or more actuators that rotate the spacecraft about the rotational axis include one or more reaction wheels that are in electronic communication with the one or more processors.

4. The control system of claim 1, wherein the one or more processors execute instructions to:
    determine the rotational axis that the spacecraft rotates about, wherein the rotational axis is substantially perpendicular to the field of view of the one or more star trackers.

5. The control system of claim 1, further comprising:
    one or more solar wings rotatably coupled to a main body of the spacecraft, wherein the one or more solar wings include a plurality of photovoltaic cells that generate electrical current from light.

6. The control system of claim 5, wherein the one or more processors further execute instructions to:
    instruct the one or more solar wings to rotate about a solar axis as the spacecraft rotates about the rotational axis; and
    monitor the electrical current generated by the plurality of photovoltaic cells as the one or more solar wings rotate about the solar axis.

7. The control system of claim 6, wherein the one or more processors further execute instructions to:
    determine a maximum local value of the electrical current as the one or more solar wings rotate about the solar axis; and
    determine an angular position of the one or more solar wings relative to the solar axis when the electrical current is at the maximum local value.

8. A spacecraft configured to orbit a celestial body, the spacecraft comprising:
    a main body defining a rotational axis;
    one or more star trackers that each include a field of view to capture light from a plurality of space objects surrounding the celestial body;
    one or more actuators;
    one or more processors in electronic communication with the one or more actuators; and
    a memory coupled to the one or more processors, the memory storing data into a database and program code that, when executed by the one or more processors, causes the spacecraft to:
        instruct the spacecraft to enter a safing mode, wherein the spacecraft revolves in an orbit around the celestial body;
        in response to entering the safing mode, determine a current attitude of the spacecraft is unknown and instruct the one or more actuators to rotate the spacecraft about the rotational axis, wherein the one or more star trackers capture the light from the plurality of space objects surrounding the celestial body as the spacecraft rotates about the rotational axis to create measurements that represent a current attitude of the spacecraft;
        determine the current attitude of the spacecraft based on the measurements created the one or more star trackers; and
        in response to determining the current attitude, instruct the one or more actuators to re-orient the spacecraft from the current attitude into a momentum neutral attitude.

9. The spacecraft of claim 8, wherein the one or more processors execute instructions to:
    instruct the one or more actuators to substantially align a principal axis of the spacecraft with a vector that is normal to the orbit around the celestial body as the spacecraft is re-oriented into the momentum neutral attitude.

10. The spacecraft of claim 8, wherein the one or more actuators that rotate the spacecraft about the rotational axis include one or more reaction wheels that are in electronic communication with the one or more processors.

11. The spacecraft of claim 8, wherein the one or more processors execute instructions to:
determine the rotational axis that the spacecraft rotates about, wherein the rotational axis is substantially perpendicular to the field of view of the one or more star trackers.

12. The spacecraft of claim 8, further comprising:
one or more solar wings rotatably coupled to the main body of the spacecraft, wherein the solar wings include a plurality of photovoltaic cells that generate electrical current from light.

13. The spacecraft of claim 12, wherein the one or more processors further execute instructions to:
instruct the one or more solar wings to rotate about a solar axis as the spacecraft rotates about the rotational axis; and
monitor the electrical current generated by the plurality of photovoltaic cells as the one or more solar wings rotate about the solar axis.

14. The spacecraft of claim 13, wherein the one or more processors further execute instructions to:
determine a maximum local value of the electrical current as the one or more solar wings rotate about the solar axis; and
determine an angular position of the one or more solar wings relative to the solar axis when the electrical current is at the maximum local value.

15. A method for executing a safing mode sequence for a spacecraft, the method comprising:
instructing, by a computer, the spacecraft to enter a safing mode, wherein the spacecraft revolves in an orbit around a celestial body;
in response to entering the safing mode, determining a current attitude of the spacecraft is unknown and instructing one or more actuators to rotate the spacecraft about a rotational axis, wherein one or more star trackers capture light from a plurality of space objects surrounding the celestial body as the spacecraft rotates about the rotational axis to create measurements that represent a current attitude of the spacecraft;
determining, by the computer, the current attitude based on the measurements received from the one or more star trackers; and
in response to determining the current attitude, instructing the one or more actuators to re-orient the spacecraft from the current attitude into a momentum neutral attitude.

16. The method of claim 15, further comprising:
instructing, by the computer, the one or more actuators to substantially align a principal axis of the spacecraft with a vector that is normal to the orbit around the celestial body as the spacecraft is re-oriented into the momentum neutral attitude.

17. The method of claim 15, wherein the spacecraft includes one or more solar wings, the method further comprising:
instructing the one or more solar wings to rotate about a solar axis as the spacecraft rotates about the rotational axis; and
monitoring an electrical current generated by a plurality of photovoltaic cells as the one or more solar wings rotate about the solar axis.

18. The method of claim 17, further comprising:
determining a maximum local value of the electrical current as the one or more solar wings rotate about the solar axis; and
determining an angular position of the one or more solar wings relative to the solar axis when the electrical current is at the maximum local value.

19. The control system of claim 1, wherein the one or more actuators includes a plurality of internal actuators and a plurality of external actuators.

20. The control system of claim 19, wherein the plurality of internal actuators include at least one of a reaction wheel and a control moment gyroscope and the plurality of external actuators include at least one of a thruster and one or more magnetic torque rods.

* * * * *

UNITED STATES PATENT AND TRADEMARK OFFICE
CERTIFICATE OF CORRECTION

PATENT NO. : 11,338,944 B2  
APPLICATION NO. : 16/425282  
DATED : May 24, 2022  
INVENTOR(S) : Cantu et al.

Page 1 of 1

It is certified that error appears in the above-identified patent and that said Letters Patent is hereby corrected as shown below:

On the Title Page

The Left Column, Item (73), under "Assignee" reads:
"GM Global Technology Operations LLC, Detroit, MI (US)"

Should read:
"The Boeing Company, Chicago, IL (US)"

In the Claims

In Column 12, Lines 53-54, Claim 8 reads:
"the measurements created the one or more star trackers; and"

Should read:
"the measurements created by the one or more star trackers; and"

Signed and Sealed this
Twelfth Day of July, 2022

Katherine Kelly Vidal
*Director of the United States Patent and Trademark Office*